Oct. 19, 1971  D. O. COREY  3,613,165

PRESS FOR FORMATION OF MOLDED OBJECTS

Filed Jan. 21, 1969  3 Sheets-Sheet 1

INVENTOR:
DWIGHT O. COREY
BY
Howson & Howson
ATTYS.

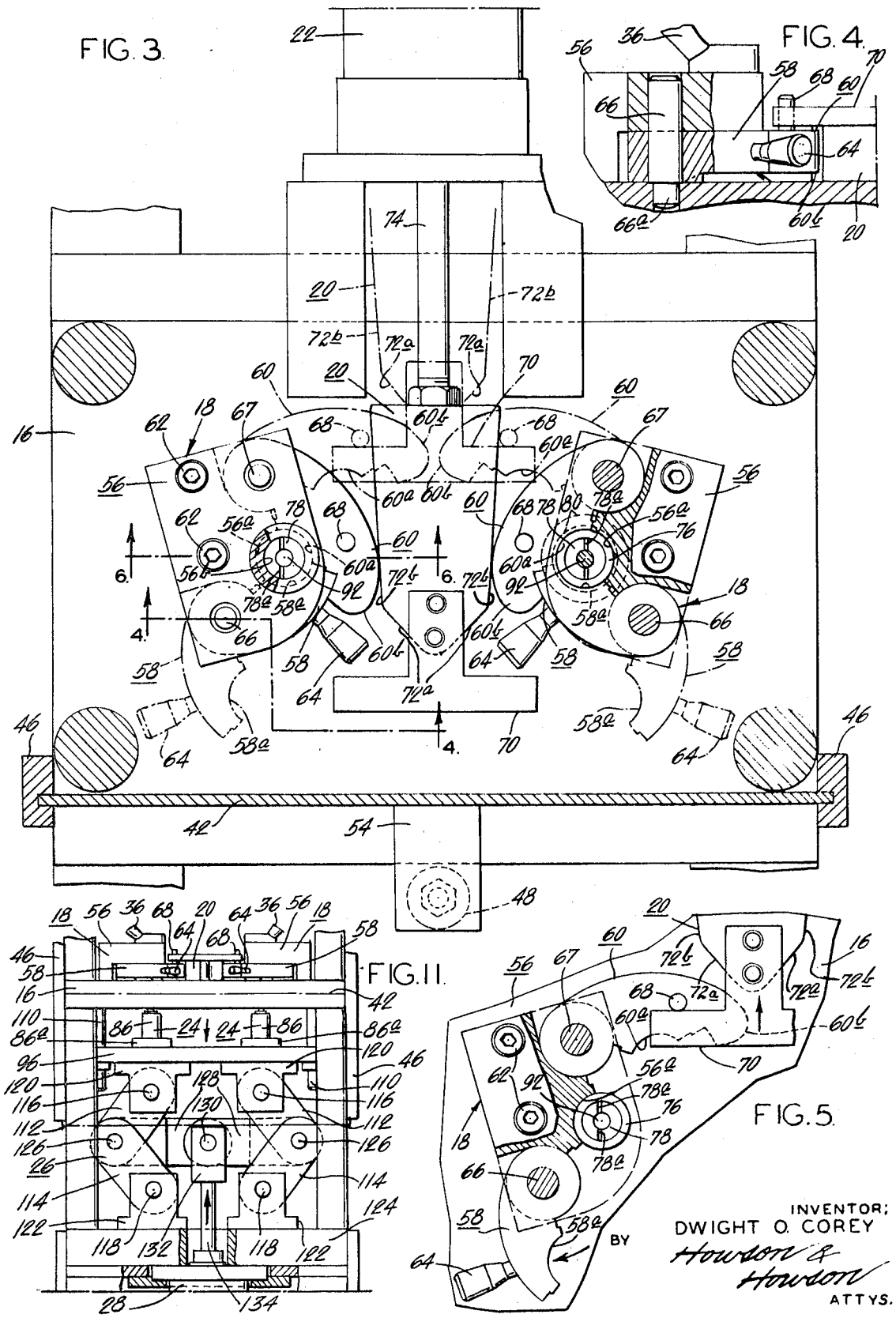

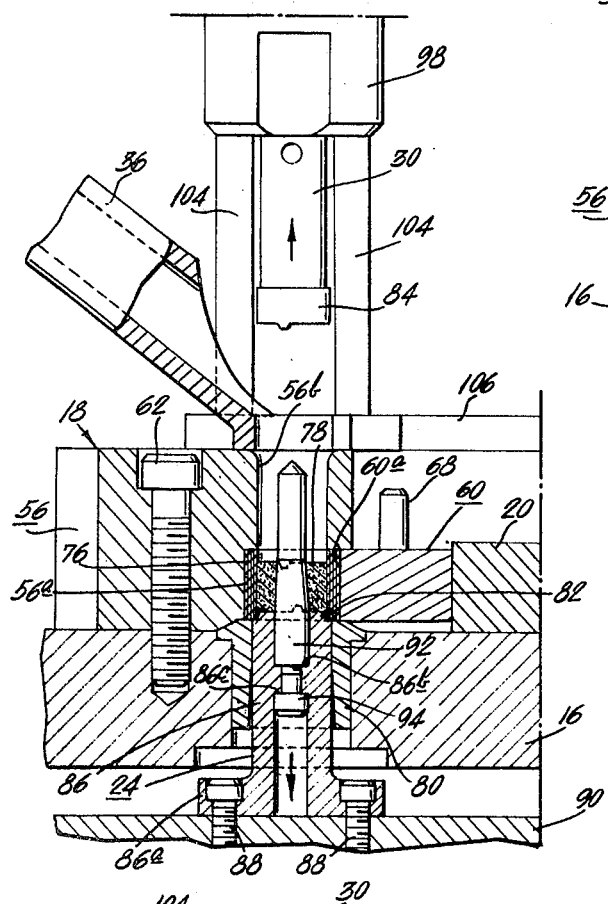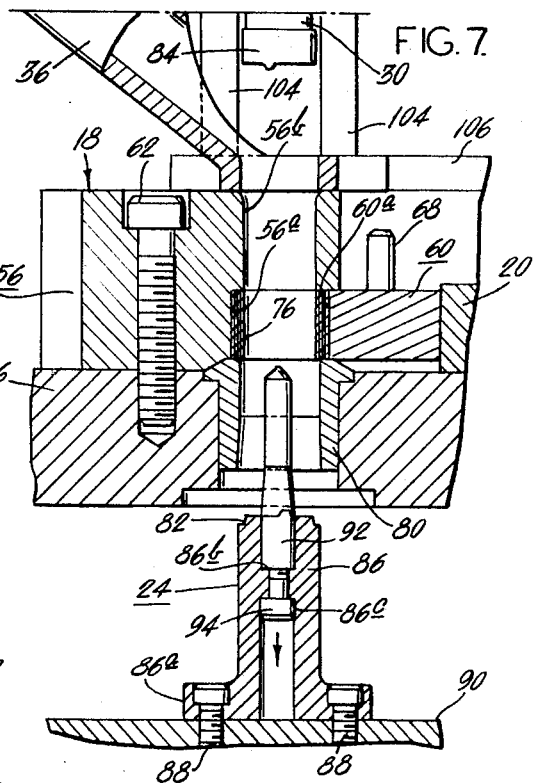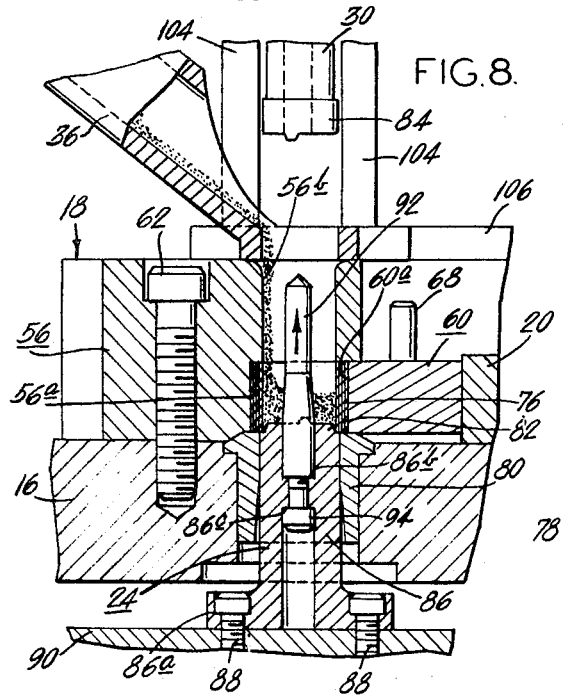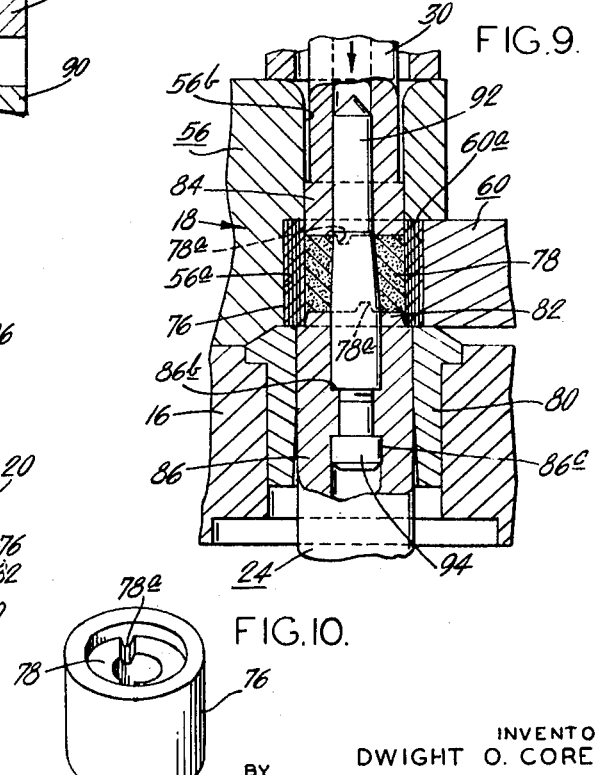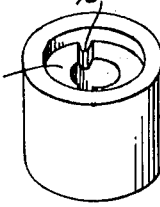

United States Patent Office 3,613,165
Patented Oct. 19, 1971

3,613,165
PRESS FOR FORMATION OF MOLDED OBJECTS
Dwight O. Corey, Memphis, Tenn., assignor to
Ambac Industries, Incorporated
Filed Jan. 21, 1969, Ser. No. 792,556
Int. Cl. B30b 11/00
U.S. Cl. 18—16.5                                    24 Claims

ABSTRACT OF THE DISCLOSURE

This press forms a molded object in a mold which is open at at least one end to receive flowable moldable material which has a lateral wall which is movable in order to permit lateral removal from the mold of a molded object. A tube is first inserted laterally into the mold and the mold is closed. A mold bottom is moved upwardly into the bottom of the mold and closes the bottom of the mold. Flowable moldable material is allowed to enter the open upper end of the mold by gravity flow, after which a ram is driven down into the upper end of the mold and into the moldable material to compress and mold that material into a molded object. Thereafter the ram and mold bottom are withdrawn from the mold and the mold wall is opened laterally to permit the removal of the molded object.

---

This invention relates to a press for making molded objects wherein the objects may be laterally removed from the mold. The invention includes a mold with a laterally movable sidewall to permit access to molded objects.

Heretofore when making molded objects of flowable moldable materials, such as powders, which are compressed into a molded object, it has been the practice to assemble many pieces of the mold, fill the mold with material to be molded and then place it in a press for compression molding. This procedure involved many pieces and many steps and took much time. An example of an operation heretofore performed by tedious hand processing is the making of so-called "stars" for pyrotechnic aerial display devices. In order to make such devices, a cylindrical mold piece was provided with a core and suitable annular end sections. A cardboard sleeve was first inserted into the mold lengthwise of the mold, then a quantity of the explosive powder was measured and poured into the assembly. This completed assembly was then placed by hand into a press and the structure compressed through its end closures to form the star. After the star was formed the assembly had to be disassembled, frequently using special techniques for pulling the core out and disassembling the molded object. Many time consuming steps were required in each part of the process and it took a relatively long time to produce the molded stars.

With the development of the press of the present invention one operator sitting at the press, feeding in cardboard sleeves and removing completed star assemblies is now able to accomplish as much as twenty-four people could previously in a similar period of time using several conventional presses. In the case of the use of explosive materials, as in the manufacture of stars, the processing is done with greater safety as the explosive powders are automatically measured and handled by machine and the machine's operation is exactly repeatable within predictable bounds of safety time after time. This repeatability also results in a more uniform product with more uniform performance than where the process was left to human variations.

The use of a mold with a wall which is laterally movable for access to the mold cavity from a lateral direction represents a new approach in the art. Moreover, means for actually accomplishing the removal of a wall section and means for locking the wall section in place are elements of novelty offering great practical adavntage in this present invention.

More specifically, the present invention relates to a press for formation of molded objects from flowable moldable material. The mold of the structure is open at at least one end for material feed and has a lateral wall which is movable in order to permit lateral removal from the mold of a molded object. Feed means is provided for feeding flowable moldable material into at least one open end of the mold. Finally press means is provided for compressing the moldable material into the mold by moving into open end of said mold.

For a better understanding of the present invention, reference is made to the drawings accompanying the specification in which FIG. 1 is a front elevational view of a two mold press of the present invention;

FIG. 3 is an enlarged sectional view taken along line 3—3 of FIG. 1;

FIG. 4 is a detailed sectional view taken along line 4—4 of FIG. 3;

FIG. 5 is a detailed partial view showing part of the structure of FIG. 3 with the mold in open position;

FIG. 6 is a further enlarged detailed sectional view taken along line 6—6 of FIG. 3 showing the ram raised after a star has been pressed;

FIG. 7 is a view similar to FIG. 6, but showing the mold bottom being raised from a lower position after the star has been removed and a new sleeve put in place in the mold;

FIG. 8 is a further detailed view similar to FIGS. 6 and 7 showing the mold in the process of filling;

FIG. 9 is a detailed view similar to FIGS. 6-8 showing the compressible material being molded;

FIG. 10 is a perspective view of a molded star made in the press of the present invention; and FIG. 11 is a partial view of the structure of FIG. 1 showing the mold bottoms withdrawn from the mold.

Figure 1:
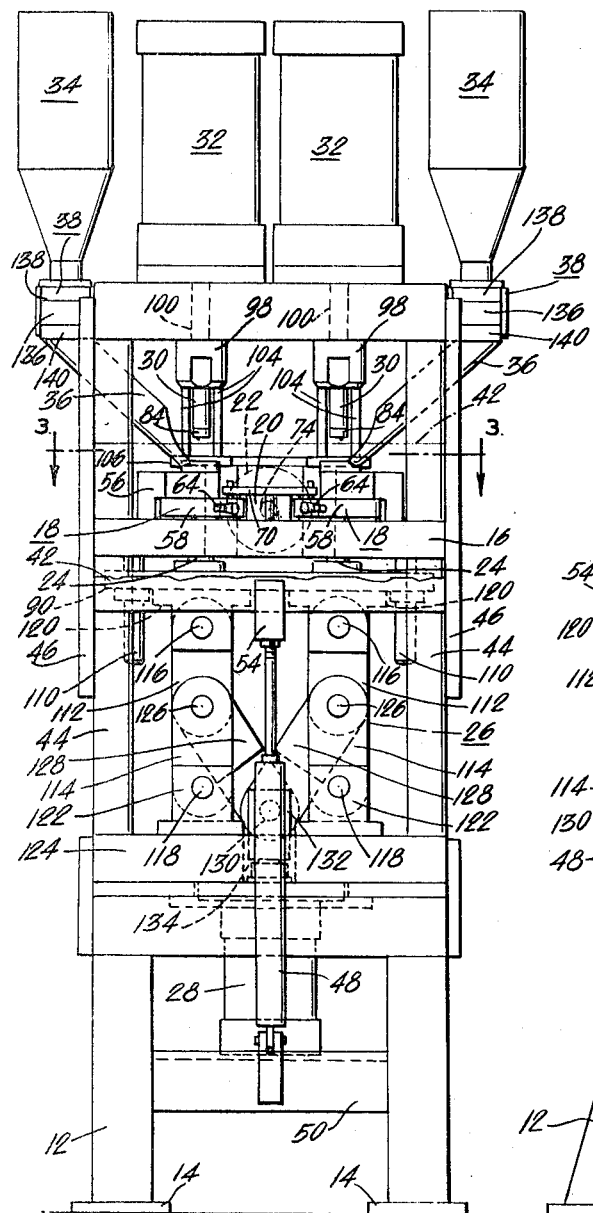
Figure 2:
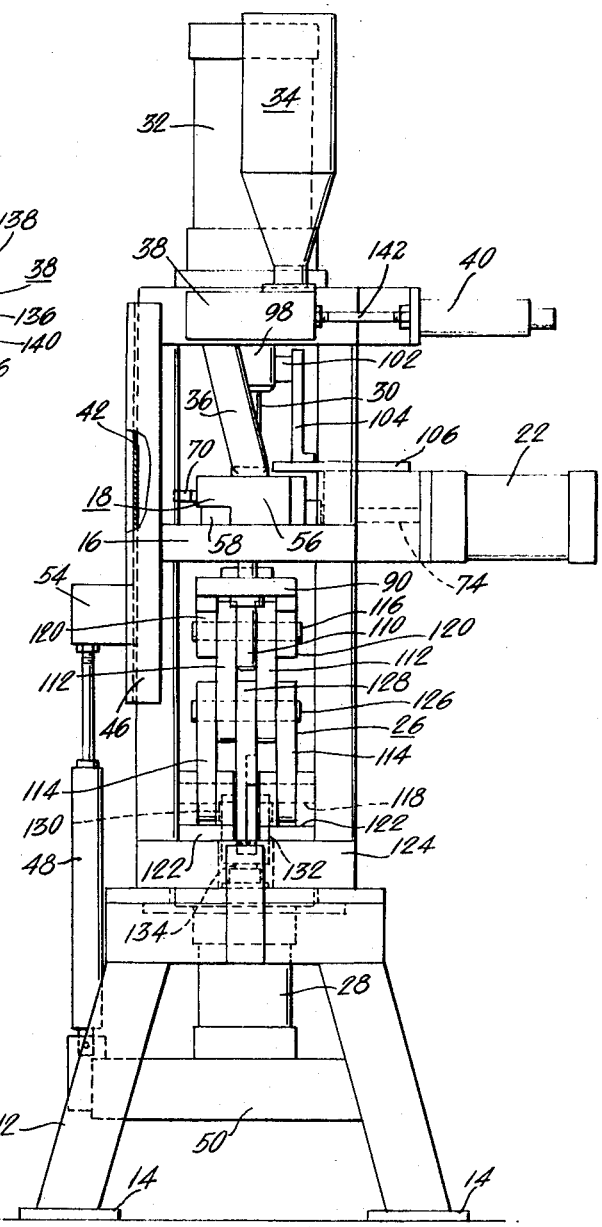
FIG. 2 is a side elevational view of the same press.

Referring first to FIGS. 1 and 2, the general arrangement of a preferred embodiment of the press of the present invention is shown. The press has a massive steel frame, which is made extra heavy in the base portion 12 and provided with legs which spread to form a broad and stable platform as seen in FIG. 2. Feet 14 may be bolted to the floor if desired.

The frame has several supporting decks made of heavy metal plate, such as handling deck 16 which is placed at a convenient height above ground to facilitate work on the press. On deck 16 there are mounted a pair of molds, generally designated 18, in which molded objects are formed by the press. Each of these molds is adapted to open toward the front (as viewed in FIG. 6) for the lateral insertion of mold inserts and lateral removal of molded objects. Once the insert is positioned in the mold a part of each mold wall is closed by hand and means automatically programming the sequence of operation is initiated. First a shield is moved between the operator and the molds. Then ram 20 driven by a cylinder 22 drives a second wall portion of each of the molds closed and stop in position to hold the molds locked closed during molding. The press structure is then actuated and mold bottom elements are moved upwardly into and close the previously open bottoms of the molds. The mold bottom elements 24 have associated positioning and locking mechanism generally designated 26 and a drive cylinder 28 for moving the mold bottom element into and out of the molds. Flowable moldable material, preferably in a powdered form, is stored in bins 34 above the molds. This material is supplied to the molds through chutes 36 in amounts measured by measuring and feeding mechanism 38 which is actuated by pneumatic cylinder 40. After the moldable material is in place, rams 30 are driven downwardly into the molds by hydraulic cylinders 32 which compress the moldable material and form a molded object integral with the insert. Thereafter the ram 30 and mold bottom 24 are withdrawn. The ram 20 is then withdrawn opening a portion of the molds. The shield 42 is lowered and the mold opened the rest of the way by hand. Shield 42 is provided by a steel plate which travels in ways provided between the frame uprights 44 and pieces of angle iron 46 fixed in place to the uprights. The shield 42 is shown as transparent here. The shield is driven by pneumatic cylinder 48 from a lower position below handling deck 16 into a upper effective position between the operator and the region of the mold. Pneumatic cylinder 48 is fixed to a mounting cross piece 50 of the frame and its piston rod is attached to the shield 42 by a suitable coupling means 54.

The area of the mold structure is best seen by reference to FIGS. 3, 4 and 5. FIGS. 3 and 5 show the molds as viewed from above. Each of the molds in this particular preferred embodiment are formed by three pieces, fixed mold member 56 and movable mold wall sections 58 and 60. Movable wall sections 58 and 60 are shown in closed mold position in full lines and also in open position in dot and dash lines in FIG. 3. The fixed wall section is held to the deck 16 by bolts 62 and provides roughly a third of the mold interior as interior wall 56a. Manually movable wall section 58 is provided with a handle 64 to enable it to be withdrawn from closed to open position as seen in FIG. 3 by rotation in the general plane of the mold about its pivot pin 66, rotatably fixing it to the deck 16 as seen in FIG. 4. In the closed mold position seen in FIG. 3, the mold wall 58a provides a portion of the cylindrical mold cavity. Movable wall section 60 is quite similar to movable wall section 58 in that it is pivoted to the deck 16 by heavy pivot pin 67 about which it rotates in the general plane of the mold. In its case, however, movable wall sections 60 are simultaneously moved from the closed mold position shown in solid lines to the release position shown in dot-dashed lines by structure associated with the ram 20 which cooperates with pins 68. In this particular embodiment the structure engaging pins 68 is a T-shaped rake 70, which as shown in FIGS. 1 and 4 is oriented generally parallel to the deck 16. Pins 66 and 67 advantageously have the construction of pin 66 as shown in FIG. 4, which is received in a mating opening in deck 16. The nature of the mold forming wall sections is also seen in FIGS. 3 and 4. Section 56 is about twice the thickness of movable wall sections 58 and 60. In fact, wall section 56 has a portion extending over the movable wall sections, extending around the mold cavity and providing an upper circular guide through which moldable material flows into the mold. The shape of the fixed wall section 56 at the level of the movable wall sections can be seen from the way the right-hand fixed wall section of FIG. 3 has been broken away. By extending partially over movable wall sections 58 and 60, the fixed wall section 56 together with deck 16 provides a sort of channel guide structure and prevents misalignment. As seen in FIG. 3, when wall sections 58 and 60 are closed the mold is complete and walls 56a, 58a and 60a provide a smooth uninterrupted contour to the mold. Movable wall section 60 has a portion 60b that overlaps the outer wall of movable section 58 when closed and effectively locks it in place. The purpose of the portion 60b is to hold the movable wall section 58 locked in position when movable wall section 60 is locked in position by the ram 20. As can be seen in FIG. 3, when the ram is retracted to its dot and dashed line position, as seen in dot and dash lines it pulls T-crossbar 70 with it to draw the pins 68 and move wall sections 60 to open position. When movable section 60 is open, as seen in FIG. 3, movable section 58 can be withdrawn from the closed solid line position into the open position shown in dot and dash lines by manually pulling handles 64. When fully retracted into the position shown in FIG. 5 it is easy to remove a molded object from the mold and place an insert, such as a tubular sleeve, into the mold. Then the movable member 58 is moved back into closed position by the handle 64 before the ram 20 is brought forward. When the ram is moved forward the curved outer surface of the movable sections 60 act as cams which are first struck by the wedge nose 72a of the ram 20, and then by its tapered sidewalls 72b. These tapered sidewalls 72b in cooperation with the cam surfaces of the two movable sections 60 tend to wedge and lock these two movable sections into closed position. The portion 60b of each movable member 60 overlaps movable member 58, and as previously described, locks movable member 58 into position. The ram 20 is actuated as previously described by air cylinder 22 through the intermediary of an actuator rod 74.

FIGS. 6 and 9 show the steps of molding in the mold cavity. This particular mold is of larger diameter than access areas at the top and bottom of the mold. This larger diameter enables the engagement within the mold of a fiber tube insert, which provides the outside surface of the article made in the press, as seen in FIG. 10. The fiber tube 76, together with a hollow core 78 of fused material, molded under pressure, constitutes the assembled article. The tube is easily inserted in each mold when the mold is open, as seen in FIG. 5. A pair of such tubes are inserted, one in each of the fixtures, after the previously molded article has been removed. The manually mold movable wall section 58 is closed by hand against the tube and the automatically movable wall section 60 is then automatically closed to the tube as seen in FIGS. 6–9. The wall thickness of the fiber tube 76 is used as a means for retaining the tube in place, both above and below. The diameter opening 56b in wall section block 56 is of smaller size than that of the mold opening by the thickness of the fiber tube so that with the tube in place opening 56b appears about the same diameter as the internal diameter of the tube 76. In practice, tolerances are maintained so that opening 56b is slightly smaller for most tubes and no larger than the smallest. Beneath the mold on deck 16 is a bushing 80 also of smaller diameter than the mold cavity 56a. This bushing is set in a bore in deck 16 and has a radial flange at its upper end, which in part projects above the deck and in part is recessed into the deck. The part of the flange projecting above the deck provides a bevelled surface starting from deck level at its outer edge, and terminating in a flat surface perpendicular to the axis of the bore atop which the fiber tube is placed. The block providing fixed wall section 56 is cut away to clear bushing 80, and movable wall sections 58 and 60 are of a height corresponding to the mold cavity height and the fiber tube length, at least in the areas of mold walls 58a and 60a, and at the proper level above deck 16 to clear bushing 80. The bearing portions of movable wall sections surrounding the pins 66 and 67 are of heavier construction and thicker extending to the deck level so that they effectively hold the movable wall sections 58 and 60 spaced above the deck in other areas, as seen in FIGS. 6 through 9.

FIG. 6 shows the mold structure after an object such as "star" 78, has been molded and after the ram 30 and its die 84 has just been moved upward away from the molded object and mold bottom 24 and the lower die 82 is about to be removed downwardly.

FIG. 7 shows the position of the elements after the star molded in FIG. 6 has been removed and a new fiber tube has been inserted into the mold and the mold closed. Both of the opposed dies 82 and 84 are still withdrawn.

In FIG. 8 the lower die 82 has been brought into place forming a bottom of the mold cavity and the flowable moldable material, preferably in the form of a powder mixture, is being added to the mold.

FIG. 9 shows the powder in the mold being pressed.

These drawings disclose in particular dies 82 and 84, which are opposed and provide flat surfaces to the molded material, which is confined in the mold cavity, and within the tubular fiber insert. Each of these dies has a ridge which is parallel to and slightly laterally offset from the diameter with the respective ridges lying on opposite sides of the diameter to form grooves offset from one another in the annular "star" which is formed by the dies. These ridges form grooves like the groove 78a seen in FIG. 10, which accepts a match fuse for igniting the material of the star at the proper time.

Each die 82 is an integral part of a generally cylindrical steel ram 86, which is narrowed and bevelled at its upper end to form the die, and which is provided at its lower end with a circumferential flange 86a held to the deck 90 by bolts 88. Member 86 is counter-bored to have a smaller diameter portion somewhat above the center providing shoulder 86b against which pin 92 is inserted to project upward above the die 82 and shoulder 86c, against which the head of bolt 94 holding the pin 92 in place is anchored. Pin 92 extends through the mold and provides a core about which the hollow "star" is formed. Pin 92 in the region of the mold cavity, provides a very slight taper upwardly from the die 82 a smaller diameter to facilitate stripping from the molded "star" 78. Above this tapered area pin 92 is received in an axial hole in die 84 and ram 30, which helps to preserve alignment of the opposed members in the course of molding pressures.

Each ram is supported in a moving head or chuck 98. These massive heads 98 are each connected to their respective cylinders by piston rod 100 from a piston within hydraulic cylinder 32. As seen in FIG. 2, each of the heads 98 has a slide 102 projecting from its back into the guide provided by spaced upright members 104. Spaced upright members 104, in turn, rely upon a plate 106 supported atop cylinder 22 and a pair of vertical plates mounted to the deck 16. The bottom dies 82 and bottom rams 24 are mounted as seen in FIGS. 1 and 11 on a deck 90. Deck 90 is a movable platform, slidably supported on guide posts 110 projecting downwardly from deck 16. Guide posts 110 keep the structure generally aligned. Pairs of corresponding linking levers 112 and 114 are connected to movable platform 90 and fixed platform 124 through pivotal connections 116 and 118 to support blocks 120 and 122 on those platforms. These links are connected together and to a further link 128 by pivotal connection 126. Link 128, in turn, is pivotally connected by pin 130 to an adaptor 132 on the end of piston rod 134. Piston rod 134 is driven by cylinder 28 between the positions seen in FIGS. 1 and 11. As best seen in FIG. 2 cylinder 28 is supported on deck 50. The platform 90 and bottom mold closures are lowered by effectively raising the pin 130 and links 128. As seen by comparison of FIGS. 1 and 11, this has the effect, due to the configuration of the linkage, of moving pins 126 in an outward direction, into the position shown in FIG. 11. When the piston rod 134 is withdrawn into the cylinder 28, the position shown in FIGS. 1 and 2, links 112 and 114 are aligned and with pin 126 centered between pins 116 and 118 in a straight line relationship. Supported in this position by links 128, the platform 90 is in its most stable rigidly held position and capable of withstanding the great forces on line with the pins experienced when the rams 30 are driven into the molds.

The feed mechanism illustrated in FIGS. 1 and 2 are largely conventional. The bins 34 store particulate material which after measurement flows by gravity down chutes 36 into the open molds. Funnel shaped bottom portions of bins 34 direct the flowable material into a cavity of fixed volume within slide 136 when the slide is in the position shown. The cavity in slide 136 is perhaps cylindrical in form and open at top and bottom. The slide slides between top and bottom pieces 138 and 140. When its top is aligned with the funnel chute from bin 34, material will enter the hole in the slide through a hole in the top piece 138 and be held in place by the bottom piece 140. Slide 136 is moved by cylinder 40 through piston rod 142 which rakes the flowable material level with the top of the hole in the slide into a fixed volume determined by hole size.

When the slide 136 is moved to the position which overlies chute 36, it also overlies a hole in bottom 140 and the volume measured by the hole in the slide will be spilled through that hole in bottom 140 into the chute 36.

Sequencing of the steps shown in FIGS. 6, 7, 8 and 9 may be accomplished using convention controls in convention circuits. In releasing a molded object the die 84 is first withdrawn upwardly and the die 82 is next withdrawn downwardly, stripping the pin 92 from the molded object. A limit switch, for example, may be used to sense when ram 30 is withdrawn to actuate cylinder 28 to lower the bottom mold closures 24. Another switch may sense when this occurs to cause the ram 20 to withdraw and the T 70 to engage pins 68 and pull movable wall section 60 away from the locking position. Consequently, manually movable wall section 58 may be manually opened by handle 64. At this stage the molded object is withdrawn and a new tube 76, if employed, is put into mold by hand. Movable wall section 58 is manually closed back into position against this tube, using handle 64. When the two wall sections 60 are closed they may, for example, close series switches to raise the shield 42 by air cylinder 52. This may close further switch means to energize switch actuated by shield 42 when it reaches position to urge the ram 20 forward from the dotted position seen in FIG. 4 to the full line position as seen in that view, thereby closing the wall sections 60 to complete the molds and causing the ram wall sections 72b to bear against movable wall sections 58 and by wedging action of the ram surfaces 72b hold the mold structure locked in place as seen in FIG. 7. A suitable limit switch is actuated when ram 20 reaches the position shown to energize cylinder 28 causing the linkage previously described to raise platform 90 and put the bottom closure die structure 82 in place in the position seen in FIG. 8. When platform 90 is in place a limit switch may be triggered which actuates air cylinder 40 to move piston rod 142 and slide 136 to cause the flowable moldable material in powder form to be dumped into slide 36 to fall by gravity into the mold, as shown in FIG. 8. Depending upon the characteristics of the material involved, either a limit switch may be actuated when the slide is in dumping position, or a arming mechanism may be started. In any event, upon a predetermined occurrence the hydraulic cylinders 32 are actuated, driving the ram 96 downward to the position of FIG. 9 to compress the flowable material into a molded solid structure as it is held against movement within the mold walls 56a, 58a and 60a, and above bottom die 78 (the pin 92 providing a central core which results in the characteristic annular structure of the molded object). When the structure associated with ram 30 reaches a predetermined low level, a switch is actuated to reverse the flow in cylinder 32 and retract the rams as seen in FIG. 6. A limit switch may be used to sense when the ram is in position of rest and reverse the flow in cylinder 28 to move platform 90 and the die structures 24 downward.

When in lower position another switch may be engaged which causes the slide 136 to be repositioned by the cylinder 140 and cause the cylinder 22 to withdraw the ram 20. When the ram is withdrawn, withdrawing movable wall section 68, the work area is exposed by withdrawal of the shield 42 by cylinder 48 to permit manual release of the molded product and replacement thereof by a new tube.

While the mold in this case is a cylindrical mold, it will be understood by those skilled in the art that the mold could be of any shape. Furthermore, while an insert is used in this particular case in another case insert may be omitted, or a different type of insert employed and combined with the flowable moldable material. Furthermore, the structure shown is a preferred embodiment and is subject to great modification within the skill of the art to accomplish the same purposes in other ways. All these modifications within the scope of the claims are intended to be within the scope and spirit of the present invention.

I claim:

1. A press for formation of a molded object from flowable moldable material comprising:
    a mold which is open at an upper end along a vertical axis for material feeding through said open end and having a lateral mold wall which is removable laterally in order to permit lateral access into the mold to permit lateral removal from the mold of a molded object transverse to said axis,
    supply and feed means located above the mold for supplying and feeding flowable moldable material by gravity flow into the open end of the mold, and
    press means for compressing the moldable material in the mold into a solid object by moving along said axis into at least said upper end of said mold.

2. The press of claim 1 in which the feed means feeds flowable material by gravity and said at least one open end opens upwardly out of the mold.

3. The press of claim 2 in which a horizontal surface at the general level of the bottom of the mold is provided along which the molded object is removed laterally and the press means operates essentially vertically.

4. The press of claim 3 in which the press includes a member which moves up from below into the mold and provides the mold bottom, the feed is sequenced to feed flowable material to the mold after the bottom is in place, and a further press member moves down from above the mold to compress the powder in the mold.

5. A press for molding flowable material which solidifies under mechanical pressure into a solid molded object which is laterally removed from the structure comprising:
    a mold open at an upper end along a vertical axis to receive the moldable flowable material, which mold opens laterally to permit lateral removal of the completed object transverse to said axis,
    supply and feed means located above the mold for supplying and feeding the flowable material by gravity into the open end of the mold, and
    press means for applying pressure along said axis, through said open end of the mold into the material in the mold to mold said material into a solid object.

6. The press of claim 5 in which the mold opens up to release the molded object but when closed is locked in place prior to the compression of the material in the mold.

7. The press of claim 6 in which the means locking the mold is coordinated with the press means so that the mold is locked before the press means moves.

8. The press of claim 7 in which the mold is at least in part manually opened and closed but is locked and held locked automatically by a locking mechanism.

9. The press of claim 8 in which the mold has at least one wall section which is removable laterally to permit lateral removal of the molded object from the mold.

10. The press of claim 9 in which the removable wall section of the mold is pivotally connected relative to a fixed portion of the mold and pivotally moved away from the fixed portion to release the molded object.

11. The press of claim 10 in which the mold includes at least one additional wall section which is pivotally fixed to the fixed portion of the mold to engage the at least one wall section and hold it in position during molding and to move away from said one wall section to permit said mold section to be moved to release the molded object.

12. The press of claim 10 in which a pair of wall sections of the mold are pivotally connected relative to the fixed portion of the mold to move away from the molded object to permit its removal and to engage in the closed position of the mold to complete the mold.

13. The press of claim 12 in which each of the pair of movable wall sections of the mold is separately movable and must be moved to permit lateral withdrawal of the molded object.

14. The press of claim 13 in which one of the two wall sections is closed automatically by means including cam means which holds it firmly in closed position.

15. The press of claim 14 in which the automatically closed wall section is designed to overlap the other movable wall section so that when said other section is closed, it locks said other section in operating position.

16. The press of claim 15 in which the movable wall section having an overlapping portion and a cooperating moving member include a cam closing portion which holds said section in proper position for molding and the overlapping portion of said section in turn holds the other movable wall section in molding position.

17. The press of claim 16 in which the cam closing portion is provided on the movable wall section having the over-lapping portion and the cooperating moving member is a ram which moves in a fixed path past the cam surface.

18. The press of claim 13 in which at least one of the pair of wall sections is moved away from molding position automatically by means which engages it and pulls it to open position.

19. The press of claim 18 in which one of the two wall sections is closed automatically by means including cam means which holds it firmly in closed position.

20. The press of claim 19 in which the automatically closed wall section is designed to overlap the other movable wall section so that when said other section is closed, it locks said other section in operating position.

21. The press of claim 20 in which the means opening and closing the automatically closed wall section is a ram which has a portion which engages and draws the automatically closed wall section open when it moves one direction and another portion constituting the aforesaid cam means acting upon a cam section on the wall section which closes the wall section and locks said wall section in position.

22. The press of claim 21 in which the ram is provided with an arm which overlies the wall section and engages a pin on the wall section in its path of movement to open the wall section and said ram has a wedging sidewall surface which moves against the cam surface of the wall section to close the mold as the ram moves and to hold the wall section closed in a rest position.

23. The press of claim 5 in which the press means includes rams providing a pair of opposed surfaces, one acting at the bottom of the mold and the other acting at the top of the mold such that relative motion of the surfaces toward each other along said axis serves to compress the moldable material within the mold into a molded object.

24. The press of claim 23 in which the ram at the bottom of the mold mechanically locks into position and the means moving from the top is hydraulically urged against the material held by the bottom ram so that that material is compressed in the mold.

(References on following page)

References Cited

UNITED STATES PATENTS

| | | | |
|---|---|---|---|
| 2,384,163 | 9/1945 | Flowers | 18—16.5 |
| 2,393,130 | 1/1946 | Toulmin | 18—16.5 X |
| 2,431,095 | 11/1947 | Tucker | 18—16.5 X |
| 2,558,823 | 7/1951 | Crowley et al. | 18—16.5 |
| 2,582,922 | 1/1952 | Crowley et al. | 18—16.5 X |
| 2,738,550 | 3/1956 | Groves | 18—16.5 |
| 3,200,442 | 8/1965 | Haller | 18—16.5 |
| 3,289,256 | 12/1966 | Ferris | 18—16 FX |
| 3,366,368 | 1/1968 | Hibbing | 18—16.5 X |

J. HOWARD FLINT, JR., Primary Examiner

U.S. Cl. X.R.

18—16 F; 264—325